United States Patent Office

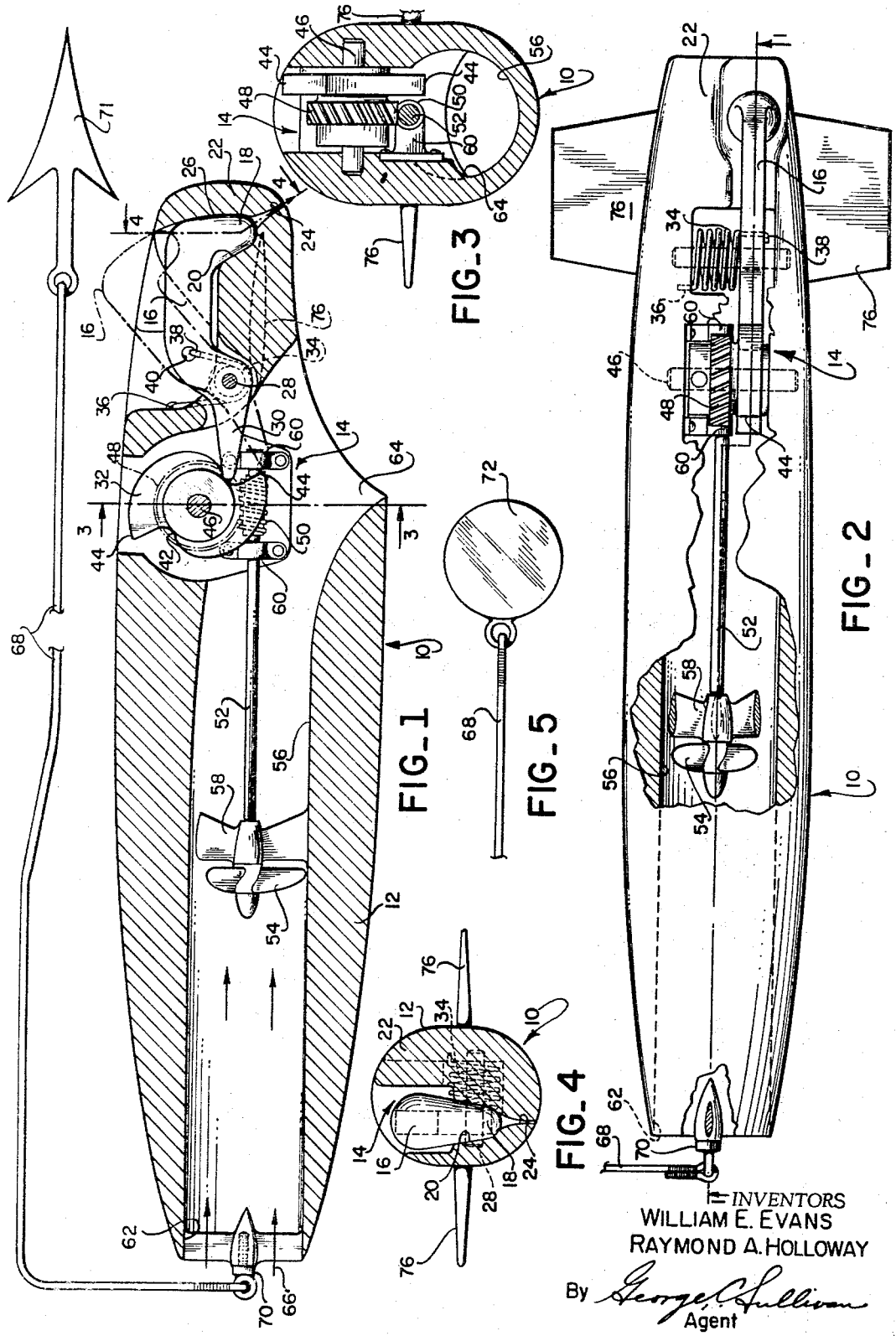

3,330,246
Patented July 11, 1967

3,330,246
UNDERWATER, BROADBAND ACOUSTIC
SOURCE
William E. Evans, Chatsworth, and Raymond A. Holloway, North Hollywood, Calif., assignors to Lockheed Aircraft Corporation, Burbank, Calif.
Filed Oct. 7, 1963, Ser. No. 314,300
6 Claims. (Cl. 116—27)

This invention relates to an underwater, broadband acoustic source, and more particularly to an apparatus for producing repeated, loud, broadband, short duration sounds under water.

A prior art problem exists in connection with tracking boats and underwater sea creatures. Prior art attempts to solve this problem have centered around the development of more reliable and efficient underwater acoustic transducers. Electro-acoustic and magnetostrictive transducers have been developed. While generally satisfactory, these transducers do have certain disadvantages.

One disadvantage resides in the fact that they are relatively large and heavy for use in tracking fish and other underwater sea creatures and vehicles.

Another disadvantage resides in the fact that poor coupling requires high inputs for relatively low outputs.

Yet another disadvantage resides in the fact that such transducers have a comparatively short range.

In view of the foregoing factors and conditions characteristic of underwater transducers, it is a primary object of the present invention to provide a new and useful underwater, broadband acoustic source not subject to the disadvantages enumerated above and having means for producing repeated, loud, broadband, short duration sounds under water efficiently, safely and expeditiously.

Another object of the present invention is to provide a mechanical, underwater, broadband acoustic source.

A further object of the present invention is to provide a mechanical, underwater, broadband acoustic source which may be readily attached to underwater objects and provide position, speed and direction of movement of such objects.

A still further object of the present invention is to provide a device of the type described wherein the power for operating the device is supplied by the object to which it is attached.

In accordance with the present invention, a device is provided which includes a spring biased plunger. The plunger cyclically forces water through an aperture when the device is operated under water. The plunger is operated by cam means which lifts the plunger above the aperture and then releases it so that the spring rapidly moves the plunger toward the aperture. In a preferred embodiment the cam means and plunger are mounted in a housing which is adapted to be pulled through the water in which the device operates. A propeller and suitable gearing are mounted in the housing and are connected to the cam so that, as the device is drawn through the water, the propeller rotates the cam. Attachment means are provided upon the housing for connecting the device to an underwater object to be tracked. Thus, so long as the object to which the device is attached moves, the plunger is cyclically driven toward the aperture to produce a broadband sound by rapidly forcing water through the aperture and by the hammer action of the plunger on the transducer body.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a cross-sectional view of a mechanical, underwater, broadband acoustic source of the present invention;

FIGURE 2 is a plan view, with parts broken away to show internal construction, of the device of FIGURE 1;

FIGURE 3 is a cross-sectional view taken along line 3—3 of FIGURE 1 with the cam and gearing shown in elevation;

FIGURE 4 is a cross-sectional view taken along line 4—4 of FIGURE 1 with the plunger shown in elevation; and FIGURE 5 is a plan view of a modified connecting means for attaching the device of FIGURE 1 to an underwater object.

Referring again to the drawings, and particularly to FIGURES 1–4, the device constituting a preferred embodiment of the present invention, generally designated 10, includes a body portion or housing 12 in which a mechanical, broadband, underwater sound projector 14 is mounted. The projector 14 includes a plunger assembly 16 having a nose portion 18 which is conformed in shape to a cavity 20 formed in the rear portion 22 of housing 12. An aperture 24 is provided in the rear portion 22 in fluid communication with the cavity 20. The cavity 20 includes a side wall 26 which slopes downwardly and inwardly toward aperture 24. The nose portion 18 is similarly shaped so that, when the cavity 20 is full of water and the nose portion 18 is suddenly seated in the cavity, the water will be forced rapidly through aperture 24 with a minimum amount of water escaping upwardly between the side wall 26 and the nose portion 18. A toroidal cavity is sometimes used in combination with a ball-end plunger. Plunger tolerance in cavity may be within normal machine levels. A good "fit" is necessary to prevent excessive back-wash.

The plunger 16 is pivotally mounted to rock on a shaft 28 and includes an arm or cam follower 30 extending into engagement with a cam 32. A spring 34 is coiled about the shaft 28, one of its ends 36 (FIGURE 2) being seated in the housing 12 and another end 38 extending through an aperture 40 in plunger 16. The arm 30 is thereby biased into engagement with the cam 32 and the nose portion 18 is biased into engagement with the side wall 26 of the cavity 20 so long as the extremity of the arm 30 is positioned at either of the lowest regions 42 on cam 32. The cam 32, which is rotatably mounted on an axle 46 in housing 12, also includes a pair or high lobes 44. As the cam 32 rotates during operational phases, the cam follower 30 is deflected with a resultant pivotal movement of the plunger 16. The plunger 16 ultimately rises to the position shown in dotted lines in FIGURE 1. As the cam lobes 44 pass under arm 30 the plunger nose portion 18 snaps into the cavity 20 under the force of spring 34. Thus, when the sound projector 14 is operated underwater, the plunger 16 rapidly displaces water from cavity 20 through aperture 24. This sets up a sharp and intense pressure wave in the water. The rapid displacement of fluid through the narrow aperture (jet)

sets up several vortices in and adjacent to the ejected stream which act as "noise generators." Some cavitation effect is also present and contributes to the resulting sound generation. The complexity of these phenomena, as a result of the highly turbulent flow, are reflected in the multiple component (complex) spectral composition of the sound produced.

The cam 32 is driven through a gear 48 which may be rigidly affixed to the cam 32 or formed integrally therewith, as shown in FIGURE 3. The gear 48 meshes with a worm gear 50 which is affixed to a propeller shaft 52. The propeller shaft 52 carries a propeller 54 at its end remote from the gear 50. The shaft 52 is rotatably mounted upon a forward strut 58 by means of a pair of rear journals 60 and within a water flow channel 56. The channel 56 is formed in the housing 12 and includes a water inlet port 62 and a water outlet port 64. As the device 10 is towed through a body of water, water entering the port 62 and flowing through channel 56 in the direction of arrows 66 rotates propeller 54, thereby causing worm gear 50 to rotate gear 48. This, in turn, rotates the cam 32 and causes the plunger 16 to be cyclically raised and snapped by spring pressure into cavity 20. The device 10 may be towed through a body of water by a tow rope 68 which is connected to the housing 12 by a web 70. As the towing progresses the cavity 20 fills with water each time the nose portion 18 is raised. As the nose portion 18 snaps into the cavity 20, water is jetted from cavity 20 out through aperture 24.

A fish may be tracked with the device 10 by connecting it to the fish with a harpoon 71, or other appropriate attachment means, which is connected to the tow line 68.

Alternatively means of attachment are sometimes provided. For example, the device 10 may be attached to an underwater metallic object by a permanent magnet 72 (FIGURE 5) which may be attached to the line 68 in place of the harpoon 71.

Stability is imparted to the device 10 by a pair of stabilizers 76 upon housing 12.

The device 10 is capable of utilization in tracking underwater craft, such as submarines, by attaching the magnet 72 to line 68 and dropping a plurality of devices 10 from an airplane over the underwater craft. Of the number which are dropped, one or more of the devices attach themselves to the craft when the magnets 72 come into contact with the craft's metal hull and are thereby towed by the craft with a resulting production of sound.

Operation of the device will be readily understood. As the device 10 is towed, the movement of the channel 56 and the propeller 54, relative to the water through which they are towed, causes rotation of the propeller 54, thereby causing the cam 32 to rotate responsive to action of the gears. This rotation ultimately causes the plunger 16 to alternately rise and snap back into position within the cavity 20, cyclically forcing water out aperture 24 with a snap-jet action, thereby creating a signal. This signal has a first component representing the structural closing (hammer) noise of the plunger and a second component representing the noise created by the water jet. A good impedance match of the whole device with the surrounding water insures a highly efficient transfer of the mechanical energy into a sharp, high-level pressure pulse at the mouth of aperture 24.

In actual practice, a 2 x 4 x 1 inch marine brass model of the device was constructed having a milled 0.188-inch diameter cavity and a 0.030-inch aperture. The device was tested in a 66-foot, 2 x 2-foot hydrotank fitted with a suspended hydrophone (TR-14 Massa). Sound pressure levels of 140–150 db (re 0.0002 microbar) were measured at a distance of 7 meters.

This method of producing underwater sounds is highly controllable when compared with prior art methods. The device of the present invention may be employed to produce broadband emissions of controllable duration with the basic, short pulse utilized alone or in combination with a group of such pulses emanating from a plurality of such devices in accordance with a program. Since the rate of movement of an object to which the device 10 is attached determines the rate of rotation of the cam 32, it is apparent that the device 10 produces quite effective signals which may be detected to provide information relative to the position, speed and direction of movement of a boat or sea creature to which the device is attached.

While the particular underwater, broadband acoustic source herein shown and described in detail is fully capable of attaining the objects and providing the advantages hereinbefore stated, it is to be understood that it is merely illustrative of the present preferred embodiment of the invention and that no limitations are intended to the details of construction or design herein shown other than as defined in the appended claims.

The basic mechanical apparatus of the invention for accomplishing the desired sound propagation for example, is sometimes utilized with power means other than the propeller concept disclosed herein. So long as the disclosed plunger and cavity combination concept is utilized in fluid in accomplishing sound propagation, it is intended that it be encompassed hereby.

What is claimed is:

1. A device for tracking a mobile object submerged in a body of water, comprising:
   body means;
   an open longitudinal passageway formed in said body means;
   means defining an open cavity in said body means and in fluid communication with said body of water;
   a restricted orifice in fluid communication with said cavity defining means;
   a plunger member having first and second end portions;
   a wall member defining a portion of said cavity and movably mounting said plunger member, said first end portion of said plunger member being operatively associated with said restricted orifice, said second end portion of said plunger member extending into said passageway;
   cam actuator means mounted in said passageway and drivingly coupled to said second end portion to thereby cyclically reciprocate said plunger member in said cavity defining means;
   fluid actuated drive means mounted in said passageway, operatively coupled to said cam actuator means; and
   tow means attached to said device whereby the flow of water through said passageway actuates said drive means.

2. The device of claim 1 including harpoon means connected to said body means for attaching said body means to an underwater sea creature.

3. The device of claim 1 including a permanent magnet connected to said body means for connecting said device to an underwater, ferromagnetic object.

4. The device of claim 1 wherein said fluid actuated drive means comprises a propeller means operatively coupled to said cam actuator means to rotate said cam actuator means when said body means is towed through said body of water.

5. A device for tracking a mobile underwater object, comprising:
   (a) a housing member having a flow channel extending therethrough to permit for the flow of water through said housing when it is towed through a body of water;
   (b) orifice means defining an aperture in said housing member;
   (c) a plunger movably mounted in said housing adjacent said aperture defining means;
   (d) cam means rotatably mounted in said housing member and drivingly coupled to said plunger for reciprocating said plunger in said flow channel to force water therethrough;

(e) propeller means rotatably mounted in said flow channel for rotation in response to water flowing therethrough as said housing member is towed through said body of water;

(f) gear means drivingly connecting said propeller means to said cam means for rotating said cam means; and (g) a tow line connected to said housing for attaching said housing to said object.

6. A device for tracking an underwater object, as defined in claim 5 wherein said plunger is provided with an end portion having a shape which conforms with the internal boundaries of one terminus of said flow channel, and which end portion is adapted to strike said housing member at said one terminus when said plunger reaches the maximum excursion of its reciprocation in said flow channel, thereby generating a hammer-like sound pulse.

References Cited

UNITED STATES PATENTS

| | | | |
|---|---|---|---|
| 669,999 | 3/1901 | Mensing | 340—12 |
| 1,117,843 | 11/1914 | Helfrich | 340—6 |
| 2,353,360 | 7/1944 | Ronning | 116—27 |
| 2,395,862 | 3/1946 | Freeman et al. | 116—27 |
| 2,611,996 | 9/1952 | Garelick | 46—92 |
| 2,704,043 | 3/1955 | Drier | 116—114 |
| 2,854,787 | 10/1958 | Oberg | 46—94 |
| 2,909,868 | 10/1959 | Lewis | 46—92 |
| 2,977,705 | 4/1961 | Rene-Guy-Busnel | 43—17.1 |
| 3,066,441 | 12/1962 | Morse | 46—95 |
| 3,083,664 | 4/1963 | Burrell | 116—27 |
| 3,097,874 | 7/1963 | Brockbank | 116—27 |
| 3,229,404 | 1/1966 | Abrahamsen et al. | 340—12 |
| 3,246,286 | 4/1966 | Barry | 116—27 |

LOUIS J. CAPOZI, *Primary Examiner.*